2,694,743
Patented Nov. 16, 1954

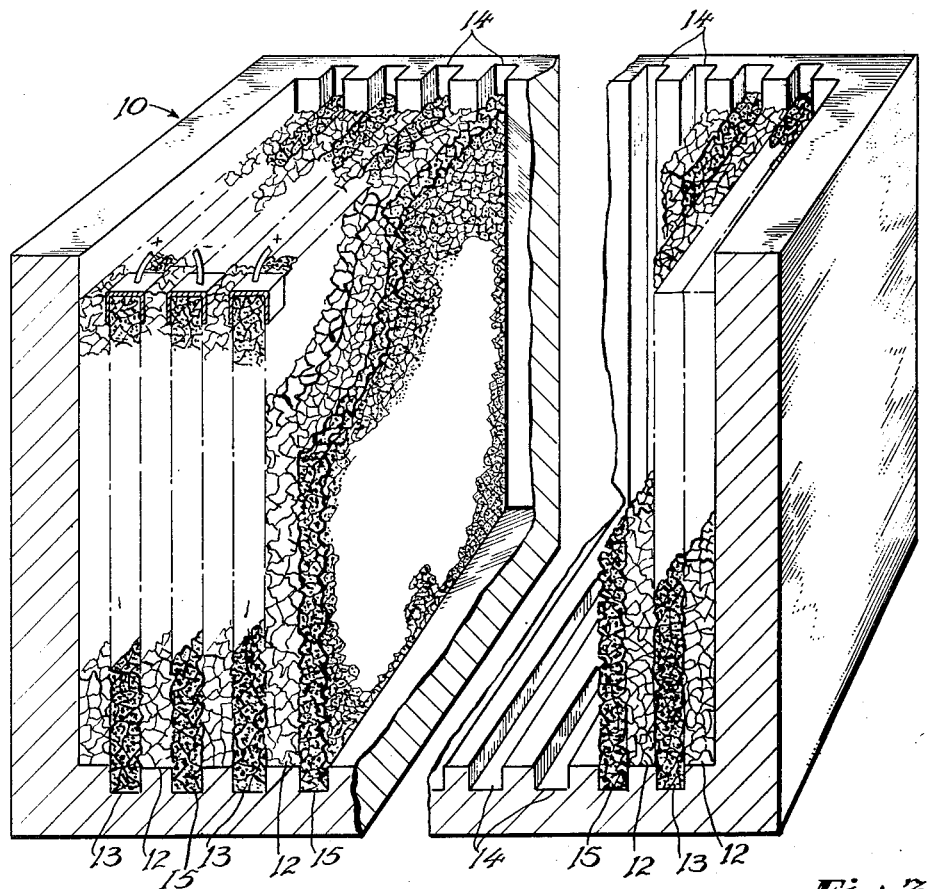
Fig. 1.
Fig. 3.
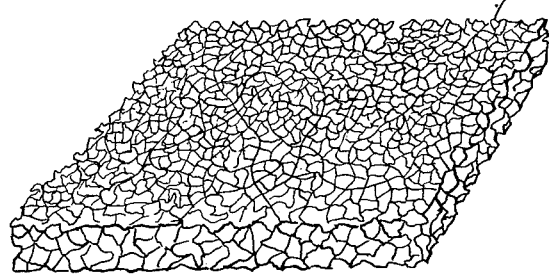
Fig. 2.
INVENTORS
Simon L. Ruskin
Aaron Bakst
BY
ATTORNEYS

United States Patent Office

2,694,743

POLYSTYRENE GRID AND SEPARATOR FOR ELECTRIC BATTERIES

Simon L. Ruskin, New York, and Aaron Bakst, Flushing, N. Y.

Application November 9, 1951, Serial No. 255,598

5 Claims. (Cl. 136—59)

This invention relates to improvements in storage batteries or accumulators and includes improvements in electrode plates, and separators for the plates, and in a battery containing a combination of such plates and separators.

The electrode plates of the present invention are porous plates made up of polystyrene foam coated throughout with metal to form the plate or electrode.

The new separators, which are advantageously used with the new battery plates, are also made of polystyrene foam.

The combination of the porous plates and porous separators in the battery is an advantageous combination, having the advantage, among others, of holding the sludge or slag formed during the operation of the battery and preventing it from collecting and accumulating in the bottom of the battery. Polystyrene foam is particularly advantageous for use in making the new plates and also for making the separators. Such polystyrene foam is a commercial product sold under the trade name "Styrofoam" by the Dow Chemical Company. It is light in weight and highly porous, with a specific gravity varying from around 1.65 to 2.0 lbs. per cubic foot. It has an indicated porosity of around 85 to 90%. It is a porous plastic material which is resistant to the chemical action of acids and alkali.

The polystyrene foam is itself a non-conductor of electrical current. In making the battery plates, the sheet of the polystyrene foam is treated to make it a conductor and is then electroplated to form the battery plate or electrode. The polystyrene foam has a surface area several times that of the surface area of a solid plate or electrode; and when coated with the metal to form the plate or electrode, gives a plate or electrode with a radically increased surface area as compared with a solid metal plate or electrode.

The electroplating of the porous polystyrene foam base to form the plate or electrode is carried out by using methods appropriate for the coating of non-conductive plastic materials. They may thus be treated to make the polystyrene plate a conductor, as by blowing on or applying a very thin layer of conductive metal or material such as copper, silver, nickel, cadmium, or graphite. The high degree of porosity of the plastic plate permits the penetration of the metal coating throughout the entire plate. The conductive plate can then be subjected to a process of protective plating with a metal which is to form the electrode, either anode or cathode, of the battery. The coating and electroplating of the polystyrene foam base results in coating all of the areas of the porous plate with conductive metal, thus giving a porous plate with a greatly increased area of metal as compared with a solid metal battery electrode. Different metals may be used for electroplating the polystyrene base. Different metals can be used, such as silver, nickel, zinc, copper cadmium, etc. Thus, one electrode may be a silver electrode and the other may be a nickel or nickel oxide electrode.

The surface area of the plate or electrode will vary somewhat but will be several times the surface area of a solid electrode, e. g. 3½ or more times the area.

The polystyrene foam separator is a thin plate of suitable thickness and of a size similar to that of the electrode. The separator plate, and the base plate which is coated with metal to form the electrode, may vary somewhat in thickness but may be, for example, about 1/16" in thickness or, in some cases, as little as 1/32". The size and thickness of the plates will vary somewhat with the size of the battery in which they are used.

The new porous plates or electrodes and the new polystyrene foam separators are advantageously used together in making the battery, with the plates and separators alternating and being in contact with each other at their surface areas. Such an arrangement of plates and separators is particularly advantageous because the separators and also the porous plates contain a relatively large volume of pores in which the sludge or slag resulting from the operation of the battery collects and is prevented from settling to the bottom of the battery. In the ordinary battery, the sludge or slag usually drops to the floor of the battery; but with the porous plate and porous separator, the slag will be effectively held and can thus be put to further use.

It will be evident that plates may be made of greater or less thickness with a reduction in the thickness of the plates so a greater number of plates can be inserted in the storage battery or accumulator of any given size, thereby permitting the obtaining of a higher degree of capacity expressed in terms of ampere hours. Thus, the reduction in the thickness of the individual plates and the increase of the number of plates in the storage battery or accumulator increase the efficiency and the performance.

Since the capacity of the battery depends on the surface area of the plates, the greater increased surface area provided by the polystyrene foam plates coated with metal gives a correspondingly greater capacity to the battery. Thus, the amperage may be increased two or three times or more. With the positive and negative plates of the battery connected in series, a high voltage and low amperage is obtained, while with the plates connected in parallel, a high amperage and low voltage is obtained.

It will be evident that the number of plates and separators in a battery can be varied as well as the thickness and size of the plates and separators. Small batteries may thus be made 1½" high, 3" long, and 1" wide, or 1½" high, 1" long and ½" wide, with plates and separators made of polystyrene foam of around 1/16" or 1/32" in thickness. In making larger batteries, somewhat thicker plates and separators will ordinarily be used.

The invention will be further described in connection with the accompanying drawing showing, in a somewhat conventional and diagrammatic manner and with a somewhat exaggerated showing of the thickness and porous structure of the plates and separators, one form of battery illustrating the invention, but it will be understood that the invention is illustrated thereby but is not limited thereto.

In the drawings:

Fig. 1 shows in cross-section and perspective, with parts cut away, a battery containing the new plates and separators;

Fig. 2 is a perspective view of one of the polystyrene foam separators and also illustrating the polystyrene base of the plate before coating with metal; and Fig. 3 is a detailed view showing one form of electrical connections to the plates.

The battery shown in Fig. 1 is made up of electrodes or plates 13 and 15 alternating with separators 12, the plates 13 being the positive plates and the plates 15 the negative plates. The plates are held in place in recesses 14 in the battery wall and the separators are placed between the plates. Provision is made for connecting the electrode wires to the electrodes by clamps 16 and 17 secured to the positive and negative plates. The external wire connections for connecting the plates in series or in parallel are not shown in the drawing. Where the clamps 16 and 17 are applied to the plates, the separators may be cut away to make room for these clamps so that the separators and plates will be close together.

The plates are made in a manner above described of taking a polystyrene foam sheet, which may be cut from a block of polystyrene foam, and shaping it to the desired thickness and area, e. g. 1/16" thick, the thickness varying somewhat with the size of the battery. These sheets are then plated with the metal to form the electrodes; thus, the electrodes may be of nickel and silver, of nickel and cadmium, of zinc and cadmium, of zinc and silver, of zinc and copper, etc. The separators can similarly be cut from the block of the polystyrene foam of appropriate size and thickness and the electrodes and separators then put together in a battery, as illustrated e. g. in Fig. 1.

It is one advantage of the new battery that the plates and separators can be put in place and the batteries shipped and stored and the electrolyte added at the time of use. The electrolyte used with the battery will vary somewhat with the metals used in forming the electrodes.

In the use of the battery, the sludge or slag which is gradually formed tends to be held in the pores of the plate to a considerable extent and also is held between the plate and separator and in the pores of the separators, thus preventing it from dropping to the bottom of the battery.

The polystyrene separators do not interfere with the osmosis of the electrolytic liquid between the plates. These separators have a sufficient degree of porosity to permit free flow of the current between the plates.

One of the advantages of the new battery is that it has a greatly increased capacity as compared with the common batteries of comparable dimensions and weight now manufactured.

Polystyrene foam is particularly advantageous for use in battery separators, even where the plates, between which they are used, are not the porous plates of the present invention.

Similarly, the new porous plates of polystyrene foam coated with metal can advantageously be used with other separators. But the combination of the new polystyrene foam separators with the plates made by coating polystyrene foam with the metals is a particularly advantageous combination, giving a combination of porous plate and porous separator with the pores cooperating in holding the sludge or slag in the operation of the battery.

Other plastics in a similar rigid, porous, foamy form resistant to the chemical action of acids and alkalis can be similarly used, but polystyrene foam has a particularly valuable combination of properties which adapts it for use with particular advantage in making the plates and separators of the new battery.

The exact structure and arrangement of the cells in the polystyrene foam is difficult to illustrate adequately and in detail in the drawings. And the drawings, therefore, are somewhat conventional and diagrammatic and somewhat exaggerate the porous foamy structure.

We claim:

1. A battery plate of highly porous rigid polystyrene foam coated throughout with metal.
2. A battery separator of highly porous rigid polystyrene foam.
3. A battery having plates of highly porous rigid polystyrene foam coated with metal.
4. A battery having its plates separated by highly porous rigid polystyrene foam separators.
5. A battery having its plates made of highly porous rigid polystyrene foam coated with metal and having separators between the plates made of highly porous rigid polystyrene foam.

References Cited in the file of this patent

UNITED STATES PATENTS

| Number | Name | Date |
|---|---|---|
| 1,922,221 | Steenbeck et al. | Aug. 15, 1933 |
| 1,942,791 | Ackermann | Jan. 9, 1934 |
| 2,176,173 | Fuller et al. | Oct. 17, 1939 |
| 2,177,819 | Booe et al. | Oct. 31, 1939 |
| 2,375,178 | Ruben | May 1, 1945 |
| 2,406,345 | Brennan | Aug. 27, 1946 |
| 2,482,062 | Hanson | Sept. 13, 1949 |

OTHER REFERENCES

Scientific American, pages 119–121, September 1947.
Plastics, vol. 9, issue 2, pages 8 and 9, November 1949.